(12) United States Patent
Shimoyama

(10) Patent No.: US 8,893,667 B2
(45) Date of Patent: Nov. 25, 2014

(54) INTERNAL COMBUSTION ENGINE

(71) Applicant: Honda Motor Co., Ltd., Tokyo (JP)

(72) Inventor: Shinji Shimoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/904,034

(22) Filed: May 29, 2013

(65) Prior Publication Data

US 2014/0020641 A1    Jan. 23, 2014

(30) Foreign Application Priority Data

Jul. 20, 2012 (JP) ................... 2012-161358

(51) Int. Cl.
*F01P 7/14*     (2006.01)
*F01P 1/02*     (2006.01)

(52) U.S. Cl.
CPC ............... *F01P 7/14* (2013.01); *F01P 2060/16* (2013.01); *F01P 2007/146* (2013.01); *Y02T 10/121* (2013.01); *F01P 1/02* (2013.01); *F01P 2001/023* (2013.01)
USPC .................. 123/41.08; 123/481; 123/198 DB

(58) Field of Classification Search
CPC ........... F01P 2060/045; F01P 2060/08; F01M 5/001; F01M 5/021; F02D 17/02
USPC ............ 123/198 F, 41.08, 41.09, 41.1, 41.28, 123/41.29, 41.33, 481, 198 DB, 568.11, 123/568.12, 568.17, 568.18, 184.33; 60/605.2
See application file for complete search history.

(56) References Cited

U.S. PATENT DOCUMENTS

| | | | |
|---|---|---|---|
| 4,436,060 A * | 3/1984 | Tanaka et al. | 123/41.1 |
| 5,690,082 A * | 11/1997 | Tanioka et al. | 123/568.12 |
| 6,786,191 B2 * | 9/2004 | Foster | 123/198 F |
| 7,966,978 B2 * | 6/2011 | Maehara et al. | 123/41.29 |

FOREIGN PATENT DOCUMENTS

| | | |
|---|---|---|
| JP | 59-029508 | 2/1984 |
| JP | 02-005059 Y2 | 5/1985 |
| JP | 3240795 B2 | 7/1995 |

OTHER PUBLICATIONS

Japanese Office Action for corresponding JP Application No. 2012-161358, Feb. 13, 2014.

* cited by examiner

*Primary Examiner* — Hung Q Nguyen
(74) *Attorney, Agent, or Firm* — Mori & Ward, LLP

(57) ABSTRACT

An internal combustion engine includes a deactivatable cylinder group, a constantly operating cylinder group, a first water passage, a second water passage, an upstream integrated water passage, a downstream integrated water passage, a connecting passage, a third water passage, and a device. The downstream integrated water passage includes a junction and an upstream end. The upstream end is closer to the second water passage than to the first water passage in the downstream integrated water passage. The third water passage connects the connecting passage and a portion provided between the junction and the upstream end in the downstream integrated water passage. The device is provided adjacent to at least a part of the third water passage to exchange heat with water flowing in the third water passage.

10 Claims, 7 Drawing Sheets

INTERNAL COMBUSTION ENGINE

CROSS-REFERENCE TO RELATED APPLICATIONS

The present application claims priority under 35 U.S.C. §119 to Japanese Patent Application No. 2012-161358, filed Jul. 20, 2012, entitled "Internal Combustion Engine." The contents of this application are incorporated herein by reference in their entirety.

BACKGROUND OF THE INVENTION

1. Field of the Invention

The present disclosure relates to an internal combustion engine.

2. Discussion of the Background

There is known an internal combustion engine, in which cooling-water passages are provided in a cylinder block and cylinder heads, water (medium) is caused to flow in the cooling-water passages to perform heat exchange among cylinders, combustion chambers, and the water, and the temperatures of other devices, such as a transmission and a throttle valve, are increased by the water increased in temperature (see, for example, Japanese Patent No. 3240795). The internal combustion engine described in this publication is a V-type engine. Water passing through the cooling-water passages provided in both banks is collected in a rear water joint, and is distributed from the rear water joint to devices that can be subjected to a temperature rise (warm-up), for example, a heater core, a throttle body, an EGR valve, and an ISC valve.

SUMMARY OF THE INVENTION

According to one aspect of the present invention, an internal combustion engine includes a deactivatable cylinder group, a constantly operating cylinder group, a first water passage, a second water passage, an upstream integrated water passage, a downstream integrated water passage, a connecting passage, a third water passage, and a device. The deactivatable cylinder group includes at least one deactivatable cylinder to be selectively operated and deactivated according to a state of the internal combustion engine during operation of the internal combustion engine. The constantly operating cylinder group includes a constantly operating cylinder to constantly operate during operation of the internal combustion engine. The first water passage is provided around the deactivatable cylinder group. The second water passage is provided around the constantly operating cylinder group. The upstream integrated water passage communicates on an upstream side with a pump and communicates on a downstream side with upstream sides of the first water passage and the second water passage. The downstream integrated water passage branches on an upstream side to communicate with downstream sides of the first water passage and the second water passage. The downstream integrated water passage includes a junction and an upstream end. The junction is provided in a middle portion of the downstream integrated water passage. The upstream end is closer to the second water passage than to the first water passage in the downstream integrated water passage. The downstream integrated water passage communicates on a downstream side of the downstream integrated water passage with a radiator. The connecting passage connects the radiator and the pump. The third water passage connects the connecting passage and a portion provided between the junction and the upstream end in the downstream integrated water passage. The device is provided adjacent to at least a part of the third water passage to exchange heat with water flowing in the third water passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
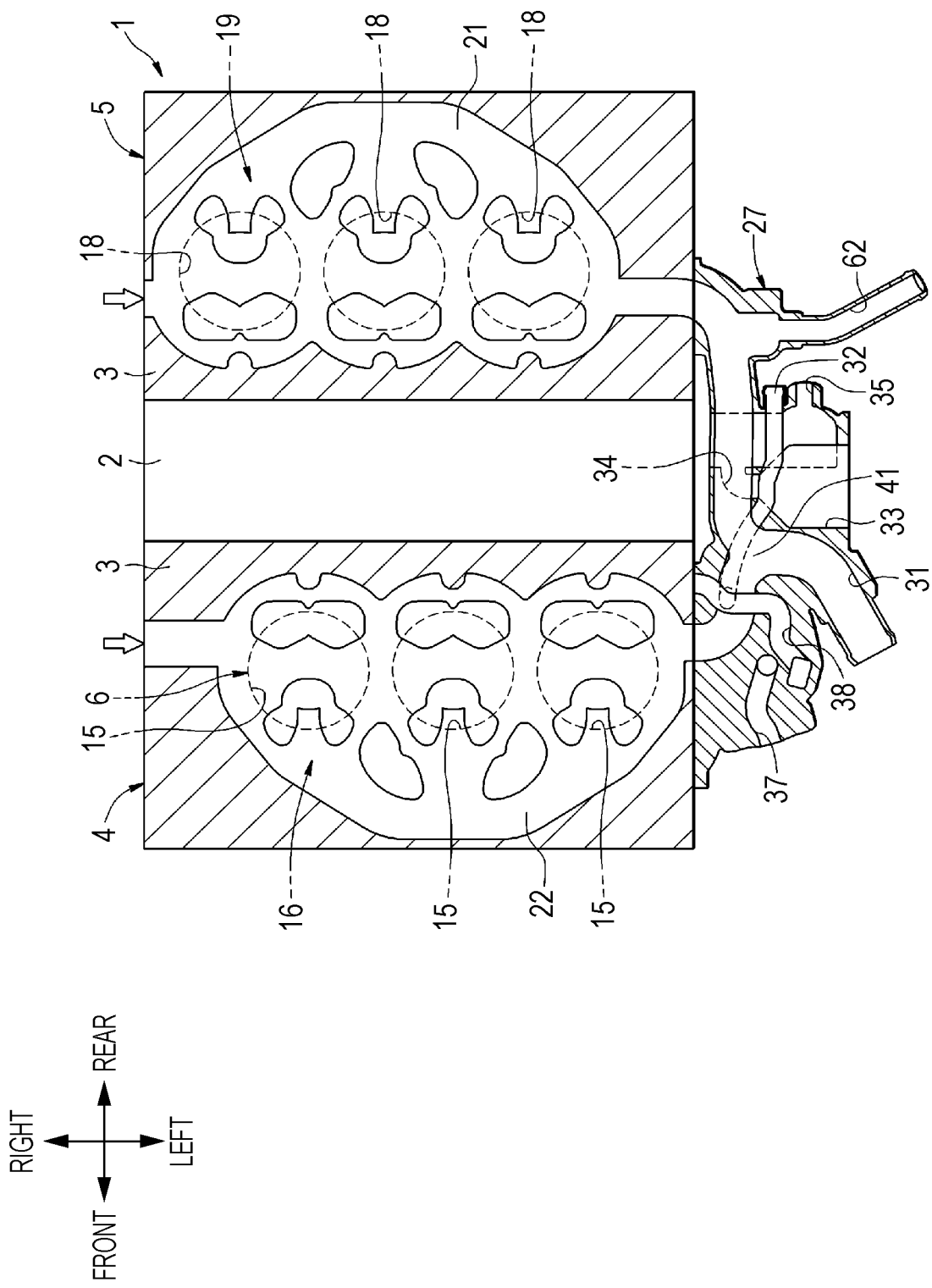
FIG. 1 is a transparent plan view of an internal combustion engine according to an embodiment.

The embodiments will now be described with reference to the accompanying drawings, wherein like reference numerals designate corresponding or identical elements throughout the various drawings.

Figure 2:
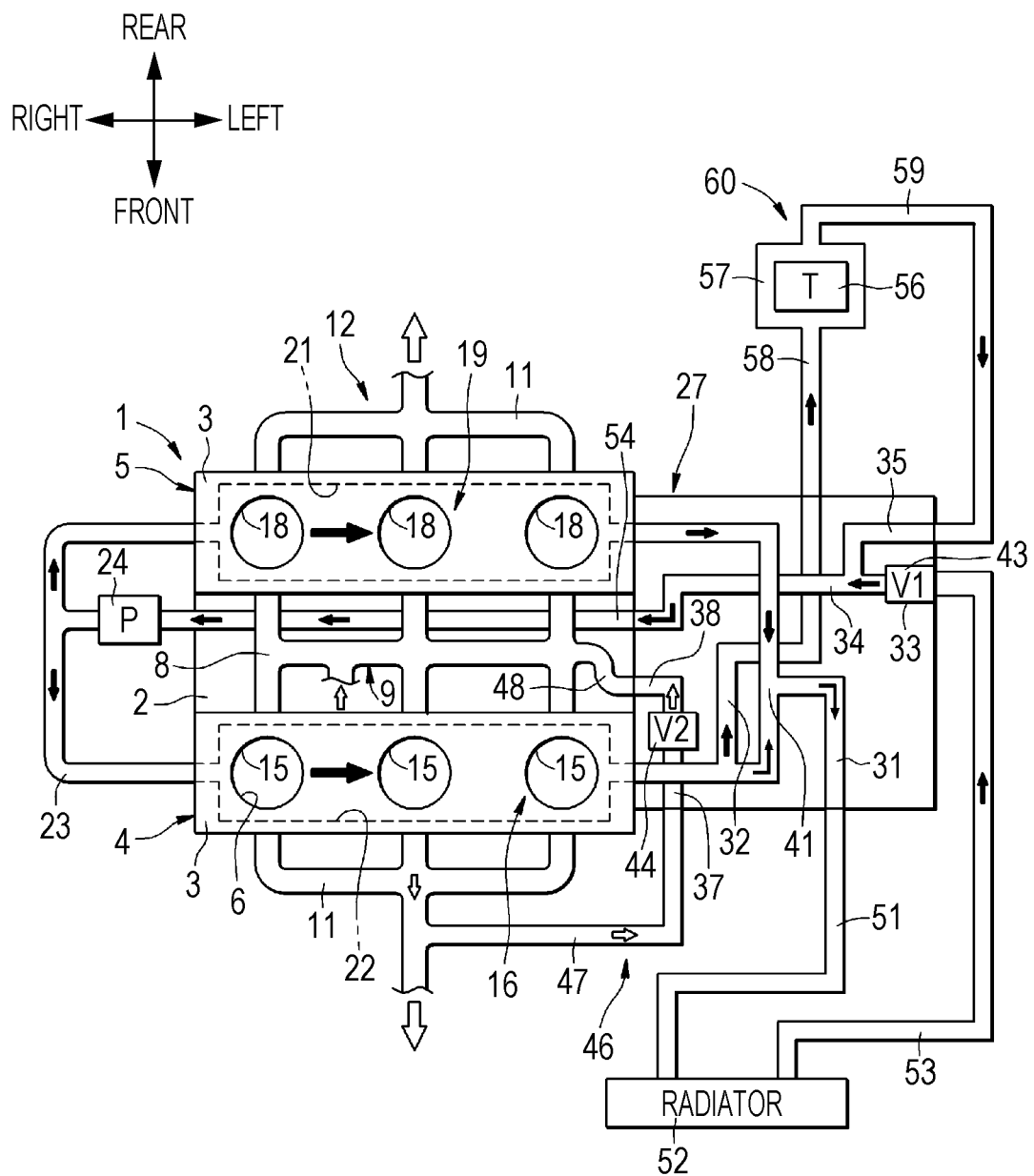
FIG. 2 is a schematic view of water passages and suction and exhaust passages in the internal combustion engine of the embodiment.

In the following description, directions are determined with reference to a frontward direction serving as an advancing direction of a vehicle in which the internal combustion engine is installed. As illustrated in FIGS. 1 and 2, an internal combustion engine 1 according to the embodiment is a V-type automotive internal combustion engine, and is installed transversely to a vehicle body such that a crankshaft (not illustrated) extends in a vehicle width direction. The internal combustion engine 1 includes a cylinder block 2 and a pair of front and rear cylinder heads 3. The cylinder block 2 and the cylinder heads 3 constitute a pair of front and rear banks 4 and 5. In portions of the cylinder block 2 corresponding to the banks 4 and 5, a plurality of cylinders 6 are arranged in the vehicle width direction. In the embodiment, three cylinders 6 are provided in each of the banks 4 and 5. Portions of the cylinder heads 3 corresponding to the cylinders 6 define combustion chambers with the cylinders 6.

The cylinder heads 3 include suction ports and exhaust ports that communicate with the combustion chambers. The suction ports are open in opposing side surfaces of the front and rear cylinder heads 3, and the exhaust ports are open in side surfaces of the cylinder heads 3 opposite from the side surfaces where the suction ports are open. The suction ports communicate with a suction-air collecting pipe 8 that branches in correspondence with the suction ports. The suction-air collecting pipe 8 communicates on an upstream side with an air inlet via a throttle valve and an air filter to form a suction system 9. The exhaust ports communicate with an exhaust-air collecting pipe 11 that branches in correspondence with the exhaust ports. The exhaust-air collecting pipe 11 is open to the atmosphere on its downstream side via a three-way catalyst and a muffler to form an exhaust system 12.

The combustion chambers include suction valves and exhaust valves for opening and closing the suction ports and the exhaust ports, respectively. The suction valves and the exhaust valves are constantly biased to closed positions by valve springs. In the cylinder heads 3, camshafts that rotate in accordance with the timing of the crankshaft are rotatably supported, and locker shafts are supported to swingably support locker arms. When the camshafts rotate, the locker arms pressed by the camshafts are displaced against the biasing force of the valve springs, and press the suction valves and the exhaust valves in an opening direction, whereby the suction ports and the exhaust ports are opened.

A cylinder group in the bank 4 provided in an front part of the internal combustion engine 1 serves as a constantly operating cylinder group 16 formed only by constantly operating cylinders 15 that constantly perform combustion at a predetermined timing during operation of the internal combustion engine 1. In contrast, a cylinder group in the bank 5 provided in a rear part of the internal combustion engine 1 serves as a deactivatable cylinder group 19 including at least one deactivatable cylinder 18 and constantly operating cylinders 15. The deactivatable cylinder 18 selectively performs combustion, that is, is selectively operated or deactivated according to a state of the internal combustion engine 1. In the embodiment, all of the cylinders 6 that constitute the deactivatable cylinder group 19 are formed by deactivatable cylinders 18. The locker arms corresponding to the deactivatable cylinders 18 have deactivation mechanisms. Each of the locker arms having the deactivation mechanisms includes a driving locker arm and a driven locker arm that are supported by a locker shaft, and a connecting pin hydraulically driven to selectively connect and disconnect the driving locker arm and the driven locker arm. The driving locker arm is pressed and swung by the camshaft. The driven locker arm swings to press the suction vale and the exhaust valve against the biasing force of the valve spring and to thereby open the suction port and the exhaust port. In the locker arm having the deactivation mechanism, when the cylinder 6 is operated, the driving locker arm and the driven locker arm are connected by the projecting connecting pin, swing together, and open the suction valve and the exhaust valve in response to the rotation of the camshaft. In contrast, when the cylinder 6 is deactivated, the connecting pin comes into the driving locker arm or the driven locker arm, and disconnects the driving locker arm and the driven locker arm. Thus, even when the driving locker arm is driven by the camshaft, the driven locker arm does not swing, and the suction valve and the exhaust valve remain closed. During deactivation, injection of fuel from an injector into the combustion chamber is stopped. Such deactivation of the deactivatable cylinders 18 is selected according to the cooling water temperature in the internal combustion engine 1, the requested engine torque, the engine rotation speed, the acceleration or deceleration of the vehicle, etc.

In the cylinder block 2 and the cylinder head 3 that constitute the rear bank 5, a first water passage 21 is provided to surround the cylinders 18 in the deactivatable cylinder group 19. In contrast, in the cylinder block 2 and the cylinder head 3 that constitute the front bank 4, a second water passage 22 is provided to surround the cylinders 15 in the constantly operating cylinder group 16. The first water passage 21 and the second water passage 22 are open in one end faces (right end faces) and the other end faces (left end faces) in a crankshaft axial direction of the cylinders 3 in the banks 4 and 5, and water flows therethrough from the one end faces on an upstream side to the other end faces on a downstream side.

As illustrated in FIG. 2, an upstream integrated water passage 23 communicating with upstream ends of the first and second water passages 21 and 22 is connected to the one end faces of the cylinder heads 3 in the crankshaft axial direction. The upstream integrated water passage 23 forms a single passage on an upstream side, bifurcates in a middle portion, and forms two passages on a downstream side. Downstream ends of the upstream integrated water passage 23 communicate with the first water passage 21 and the second water passage 22. An upstream end of the upstream integrated water passage 23 is fastened to a water pump 24.

Figure 3:
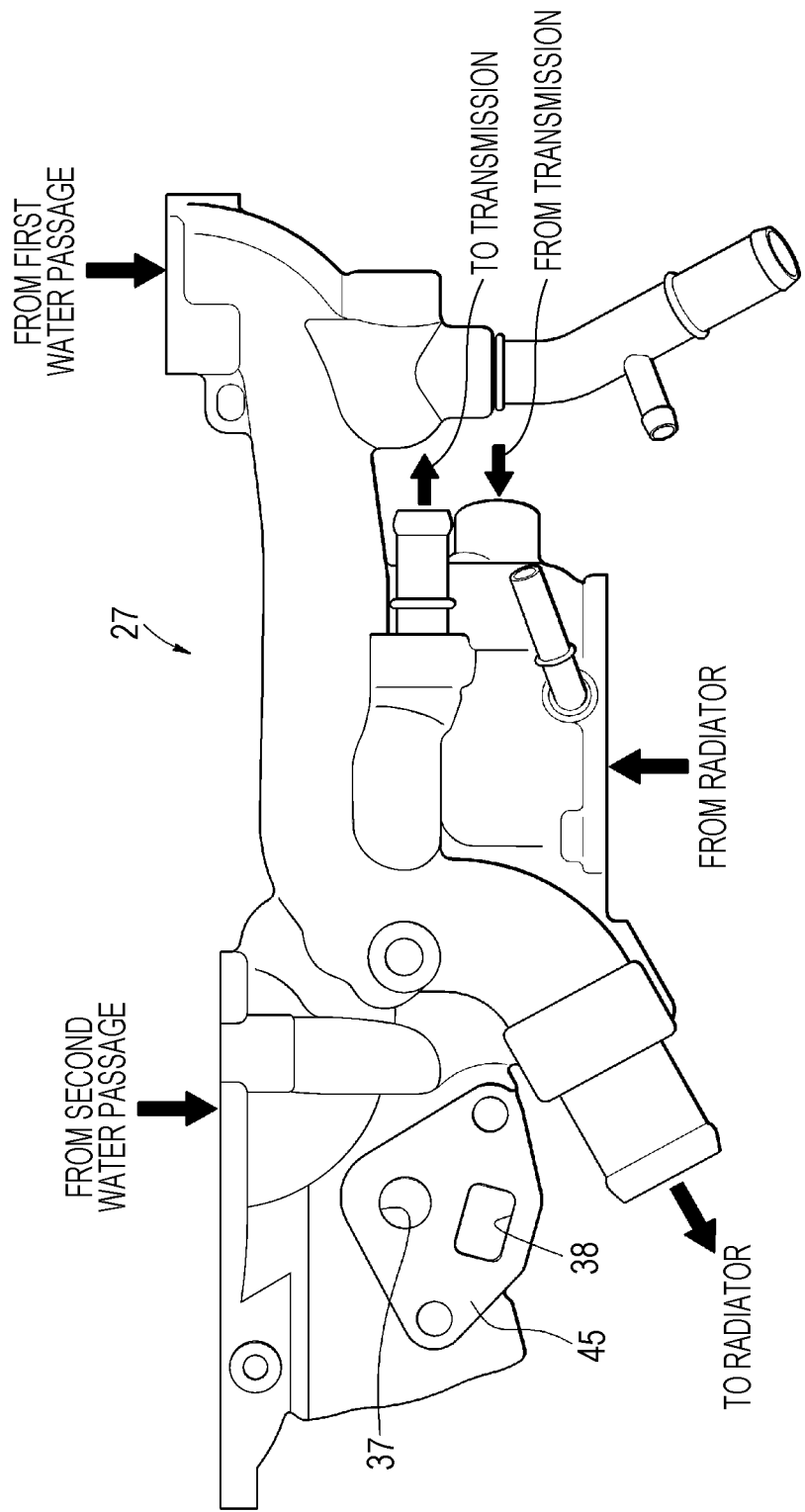
FIG. 3 is a plan view of a pipe unit in the embodiment.
Figure 4:
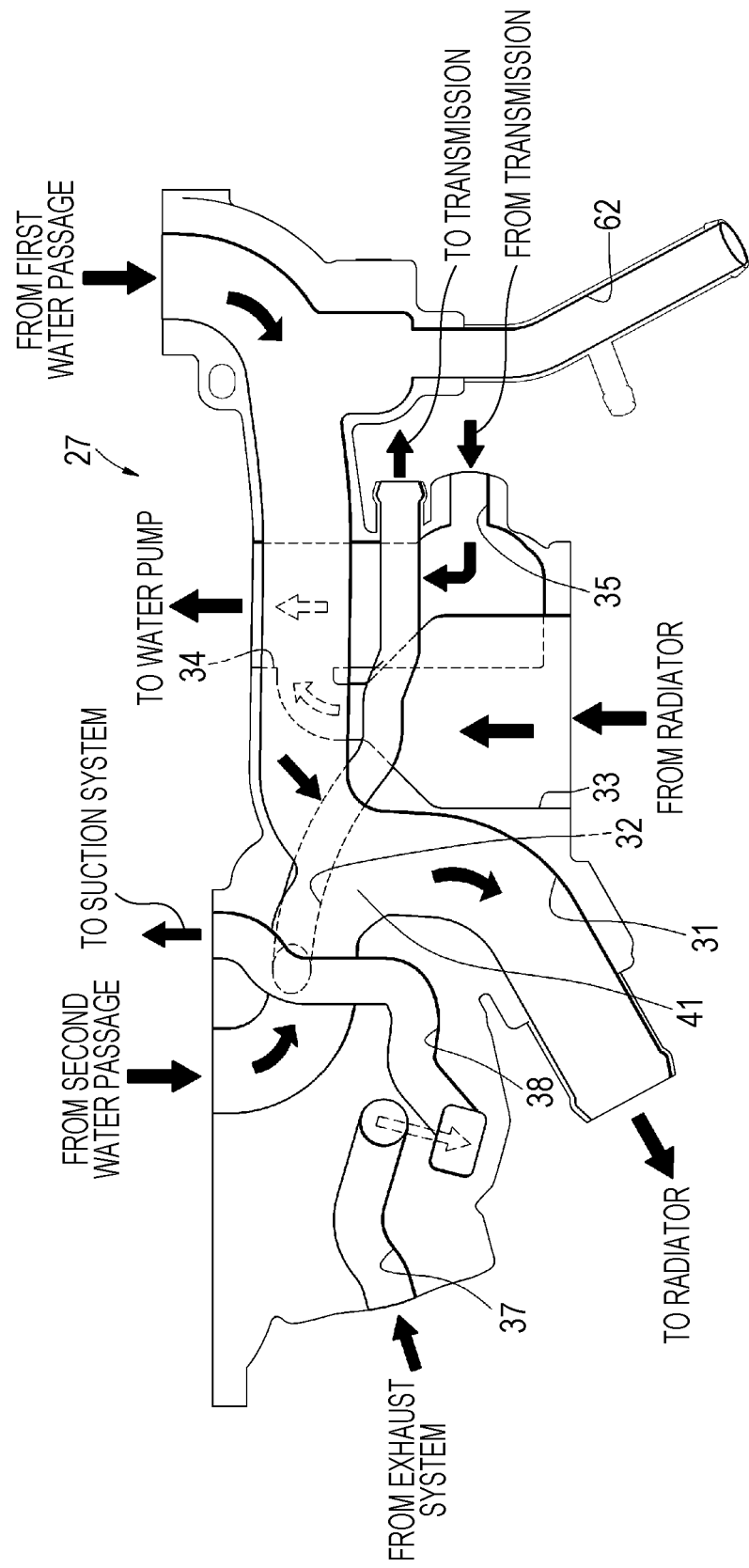
FIG. 4 is a transparent plan view of passages of the pipe unit in the embodiment.
Figure 5:
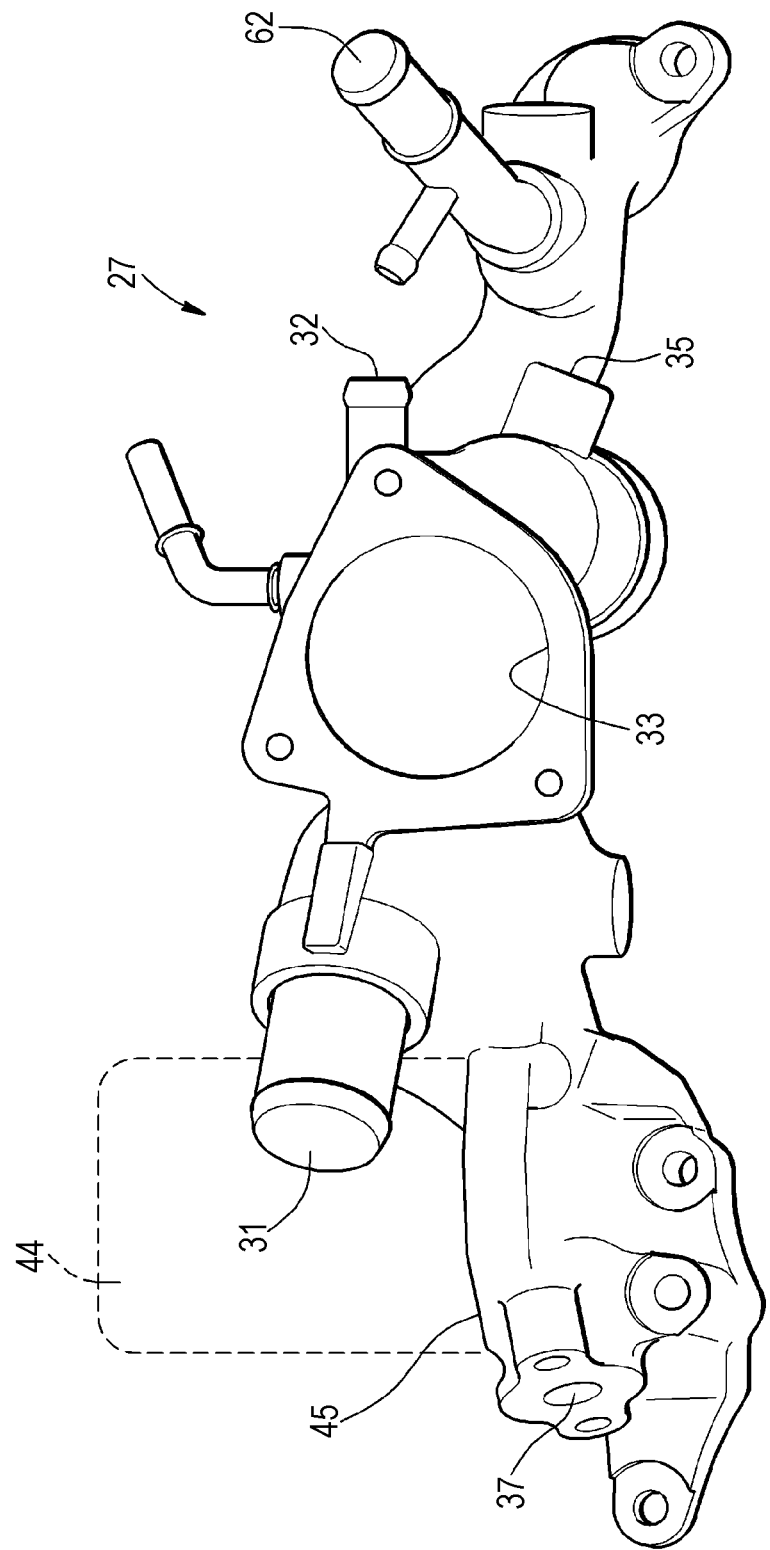
FIG. 5 is a perspective view of the pipe unit in the embodiment

As illustrated in FIGS. 3 to 5, a single pipe unit 27 is fastened to the other end faces (left end faces) of the cylinder heads 3 in the crankshaft axial direction. The pipe unit 27 is integrally molded, for example, by metal casting or resin injection molding. The pipe unit 27 integrally includes a downstream integrated water passage 31, an upstream temperature-increasing water passage 32, a valve case 33, a connecting passage 34, a downstream temperature-increasing water passage 35, a first EGR passage 37, and a second EGR passage 38.

The downstream integrated water passage 31 bifurcates on an upstream side of a junction 41 in a middle portion, and forms a single passage on a downstream side of the junction 41. Two upstream ends of the downstream integrated water passage 31 are open in a surface of the pipe unit 27 fastened to the cylinder heads 3, and communicate with downstream ends of the first and second water passages 21 and 22. A downstream end of the downstream integrated water passage 31 is open in an outer surface of the pipe unit 27.

The upstream temperature-increasing water passage 32 communicates at one end with a portion between the junction 41 and the upstream end communicating with the second water passage 22 in the downstream integrated water passage 31, and is open at the other end in the outer surface of the pipe unit 27. The valve case 33 is a recess provided in the outer surface of the pipe unit 27, and receives a thermostat 43 serving as an on-off valve, as illustrated in FIG. 2. In other embodiments, the thermostat 43 may be replaced with an electromagnetic valve. The connecting passage 34 communicates at one end with the valve case 33, and is open at the other end in the outer surface of the pipe unit 27. The downstream temperature-increasing water passage 35 communicates at one end with the connecting passage 34, and is open at the other end in the outer surface of the pipe unit 27.

As illustrated in FIG. 3, a part of the outer surface of the pipe unit 27 has an EGR-valve fastening surface 45 to which an EGR valve 44 formed by an electromagnetic valve is fastened. As illustrated in FIGS. 1 to 5, the first EGR passage 37 and the second EGR passage 38 form a part of an EGR passage 46 extending from the exhaust-air collecting pipe 11 toward the suction-air collecting pipe 8. The first EGR passage 37 and the second EGR passage 38 are open at one end in the EGR-valve fastening surface 45, and are open at the other end in the outer surface of the pipe unit 27. The other end of the first EGR passage 37 communicates with an exhaust-side EGR pipe 47 that communicates with the exhaust-air collecting pipe 11. The other end of the second EGR passage 38 communicates with a suction-side EGR pipe 48 that communicates with the suction-air collecting pipe 8. Thus, part of exhaust air flowing in the exhaust-air collecting pipe 11 passes through the exhaust-side EGR pipe 47, the first EGR passage 37, the EGR valve 44 fastened to the EGR-valve fastening surface 45, the second EGR passage 38, and the suction-side EGR pipe 48 in order, and is introduced in the suction-air collecting pipe 8. A part of the second EGR passage 38 is located near a portion between the junction 41 and the upstream end communicating with the second water passage 22 in the downstream integrated water passage 31, and near the upstream temperature-increasing water passage 32. In particular, the second EGR passage 38 is located near a connecting portion between the upstream temperature-increasing water passage 32 and the downstream integrated water passage 31. In other embodiments, the first EGR passage 37 may be located near the portion between the junction 41 and the upstream end communicating with the second water passage 22 in the downstream integrated water passage 31 and near the upstream temperature-increasing water passage 32.

As illustrated in FIG. 2, the downstream end of the downstream integrated water passage 31 communicates with an entrance of a radiator 52 via a pipe 51. An exit of the radiator 52 communicates with the valve case 33 via a first connecting pipe 53. The valve case 33 is closed by fastening the first connecting pipe 53 to the pipe unit 27. The other open end of the connecting passage 34 opposite from the valve case 33 communicates with the water pump 24 via a second connecting pipe 54.

An end of the upstream temperature-increasing water passage 32 opposite from the downstream integrated water passage 31 communicates with one end of an upstream temperature-increasing pipe 58 that communicates at the other end with an entrance of a water jacket 57 provided in a housing of a transmission 56. The water jacket 57 functions as an oil warmer that exchanges heat with oil held in the transmission 56 to increase the temperature of the oil. In other embodiments, the water jacket 57 provided in the housing of the transmission 56 may be replaced with a water jacket provided in a housing of a throttle valve, a water jacket provided in a housing of an ISC valve (idle speed control valve), or a water passage provided in a device that needs a temperature rise, for example, a heater core of an air conditioning apparatus. An exit of the water jacket 57 communicates with an open end of the downstream temperature-increasing water passage 35 via a downstream temperature-increasing pipe 59. The upstream temperature-increasing water passage 32, the upstream temperature-increasing pipe 58, the water jacket 57, the downstream temperature-increasing pipe 59, and the downstream temperature-increasing water passage 35 are connected in series, and constitute a single bypass passage (third water passage) 60 that takes a detour around the radiator 52.

As illustrated in FIGS. 1, 4, and 5, in the embodiment, an auxiliary water passage 62 extends from a portion between the upstream end close to the first water passage 21 and the junction 41 in the downstream integrated water passage 31. One end of the auxiliary water passage 62 is open in the outer surface of the pipe unit 27, and communicates with a water passage provided in another device such as a heater core. The auxiliary water passage 62 is not essential, but may be omitted in other embodiments.

In the internal combustion engine 1 having the above-described configuration, water pressure-fed from the water pump 24 is divided by the upstream integrated water passage 23, is supplied to the first water passage 21 and the second water passage 22 that are arranged to form a parallel circuit, joins again in the downstream integrated water passage 31, passes through the pipe 51, the radiator 52, the first connecting pipe 53, the valve case 33, the connecting passage 34, and the second connecting pipe 54 in order, and returns to the water pump 24. Further, the water passes through the bypass passage 60 that branches from the portion between the junction 41 and the upstream end close to the second water passage 22 in the downstream integrated water passage 31 and takes a detour around the radiator 52, that is, that is located to form a parallel circuit to a passage formed by the downstream portion of the downstream integrated water passage 31, the pipe 51, the radiator 52, the first connecting pipe 53, and the valve case 33. The thermostat 43 closes the passage formed by the valve case 33 to cut off the supply of water to the radiator 52 when the water temperature is lower than or equal to a predetermined value. In the embodiment, when the water temperature is higher than or equal to 82° C., the thermostat 43 opens to allow the supply of water to the radiator 52. When the water temperature is lower than 82° C., the thermostat 43 closes the passage, and the water, which joins in the downstream integrated water passage 31 after passing through the first water passage 21 and the second water passage 22, is all circulated to the water pump 24 through the bypass passage 60.

A description will be given of the operation of the internal combustion engine 1 having the above-described configuration with reference to FIG. 6. The internal combustion engine 1 of the embodiment includes a first temperature sensor provided near the downstream end of the second water passage 22 to measure the internal water temperature (internal-combustion-engine water temperature $Tw1$), a second temperature sensor provided near the upstream end of the radiator 52 to measure the internal water temperature (radiator water temperature $Tw2$), a third temperature sensor for measuring the temperature of engine oil stored in an oil pan of the internal combustion engine 1 (engine oil temperature $To1$), and a fourth temperature sensor provided in the transmission 56 to measure the temperature of oil stored in the transmission 56 (transmission oil temperature $To2$). The internal combustion engine 1 is controlled to deactivate all the deactivatable cylinders 18 when the internal-combustion-engine water temperature $Tw1$ becomes higher than or equal to 60° C. When the internal-combustion-engine water temperature $Tw1$ becomes higher than or equal to 82° C., the thermostat 43 opens to allow the supply of water to the radiator 52.

Figure 6:
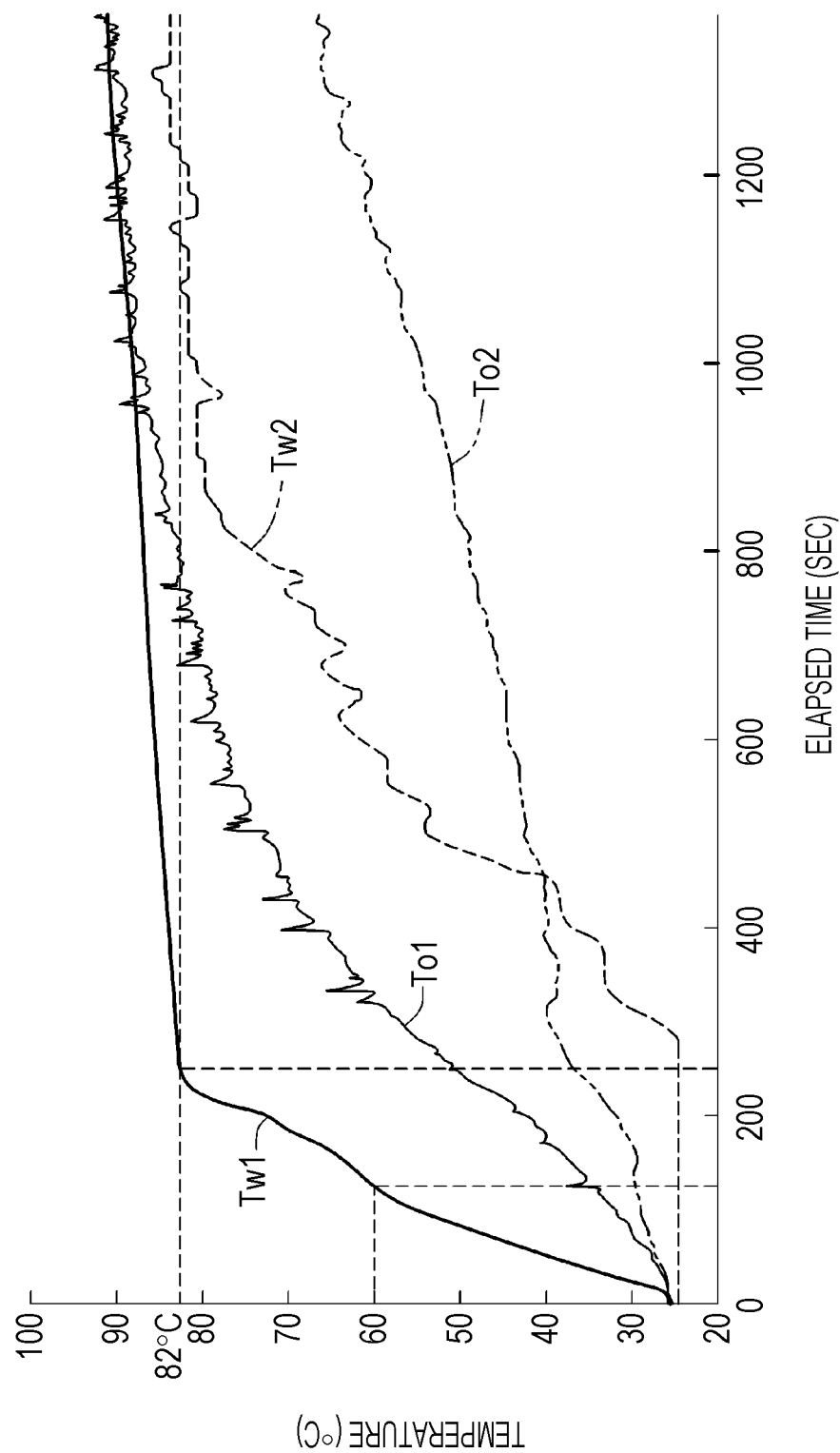
FIG. 6 is a graph demonstrating the changes in water temperature and oil temperature in the internal combustion engine of the embodiment.

As illustrated in FIG. 6, before the internal combustion engine 1 starts at a time t=0, the internal-combustion-engine water temperature $Tw1$, the radiator water temperature $Tw2$, the engine oil temperature $To1$, and the transmission oil temperature $To2$ are about 25° C., which is equal to the outside air temperature.

Immediately after the internal combustion engine 1 starts, since the internal-combustion-engine water temperature $Tw1$ is lower than 60° C., the thermostat 43 closes the passage to prohibit the supply of water to the radiator 52, and all the deactivatable cylinders 18 are operating. For this reason, water pressure-fed from the water pump 24 passes through the first water passage 21 and the second water passage 22, increases its temperature by exchanging heat with the cylinders 15 and 18, passes through the downstream integrated water passage 31, the upstream temperature-increasing water passage 32, the upstream temperature-increasing pipe 58, the water jacket 57, the downstream temperature-increasing pipe 59, the downstream temperature-increasing water passage 35, the connecting passage 34, and the second connecting pipe 54 in order, and then returns to the water pump 24. Since the temperature of the circulating water is increased in the first water passage 21 and the second water passage 22 in this state, the internal-combustion-engine water temperature $Tw1$ increases with time. Also, the engine oil temperature $To1$ is increased with time by operation of the internal combustion engine 1. The transmission oil temperature $To2$ receives heat from the water passing through the water jacket 57, and therefore, increases with time more gently than the internal-combustion-engine water temperature $Tw1$ and the engine oil temperature $to1$. The radiator water temperature $Tw2$ does not change because the flow of water into the radiator 52 is prohibited by the thermostat 43.

When about 90 seconds elapse from the start and the internal-combustion-engine water temperature Tw1 reaches 60° C., all the deactivatable cylinders 18 are deactivated. Hence, the temperature of water passing through the first water passage 21 is not increased, and the rise speed of the internal-combustion-engine water temperature Tw1 decreases. Further, when about 240 seconds elapse from the start and the internal-combustion-engine water temperature Tw1 reaches 82° C., the thermostat 43 opens the passage to allow the water to flow into the radiator 52. When the water, whose temperature is lowered by heat release in the radiator 52, is returned to the water pump 24, the rise speed of the internal-combustion-engine water temperature Tw1 pronouncedly decreases. Also, since the water passing through the first water passage 21 and the second water passage 22 flows to the radiator 52, the radiator water temperature Tw2 rises with time.

At the time when the internal-combustion-engine water temperature Tw1 reaches 82° C. and the thermostat 43 opens the passage (about 240 seconds after the start), the transmission oil temperature To2 is about 35° C., and the temperature rise (warm-up) is still not sufficient. For this reason, it is necessary to supply high-temperature water from the water jacket 57 in order to apply heat to the transmission 56. After the cylinders are deactivated, the temperature of water passing through the first water passage 21 becomes lower than the temperature of water passing through the second water passage 22 provided around the constantly operating cylinder group 16. For this reason, the upstream temperature-increasing water passage 32 is provided in the portion between the junction 41 and the upstream end close to the second water passage 22 in the downstream integrated water passage 31 on an upstream side of a position where the water passing through the first water passage 21 and the water passing through the second water passage 22 join together. This allows high-temperature water to be supplied from the water jacket 57 in order to promote the rise of the transmission oil temperature To2.

As described above, in the internal combustion engine 1 of the embodiment, the warm-up efficiency can be enhanced when the cylinders are deactivated before completion of warm-up (temperature rise) of the device needing the warm-up. Further, in the internal combustion engine 1 of the embodiment, the upstream temperature-increasing water passage 32 is formed by a member provided integrally with the second EGR passage 38 and is close to the second EGR passage 38. Hence, the temperature of water passing through the upstream temperature-increasing water passage 32 can be increased by heat received from EGR gas passing through the second EGR passage 38, higher-temperature water can be supplied from the water jacket 57, and more heat can be given to the transmission 56.

Figure 7:
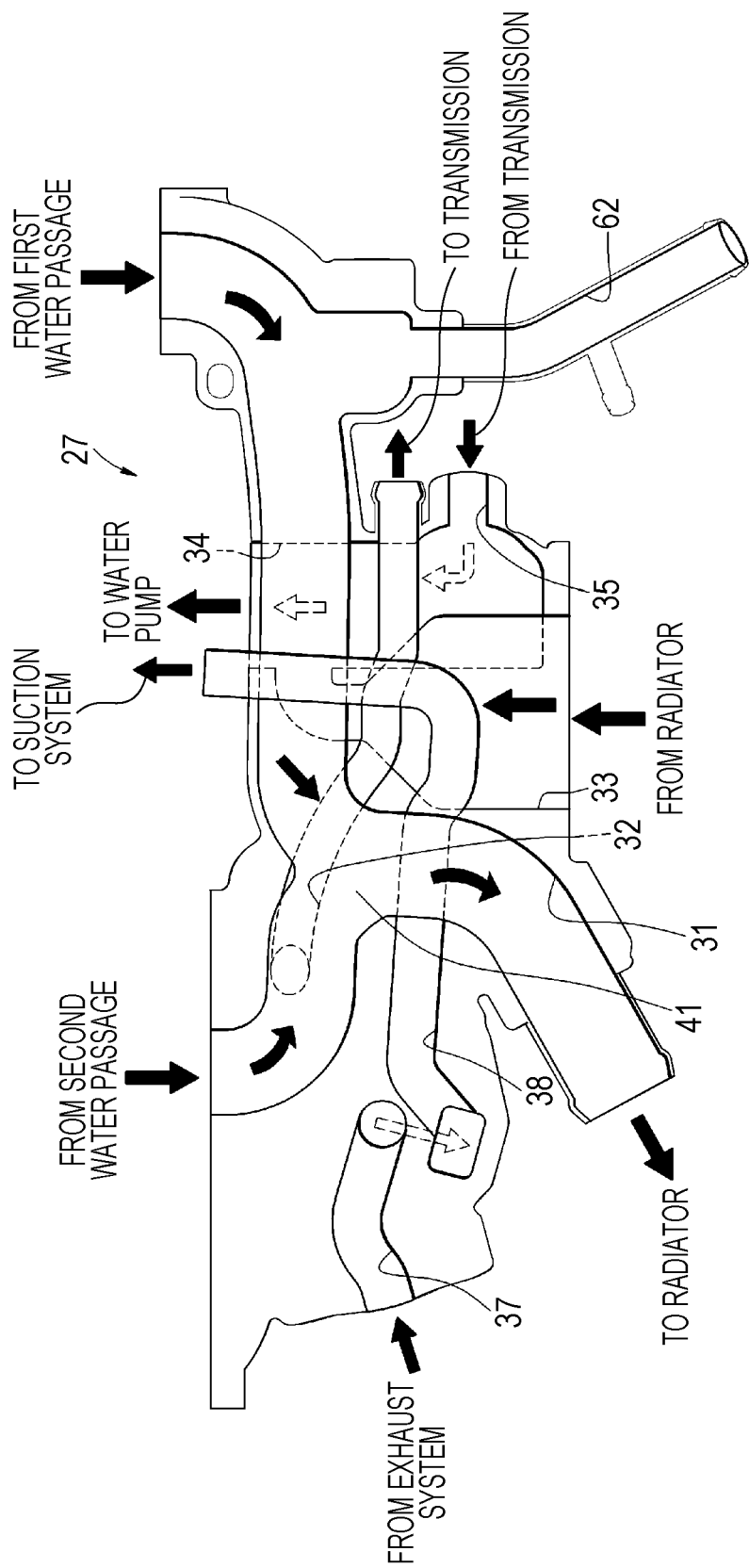
FIG. 7 is a transparent plan view of passages of a pipe unit in a modification of the embodiment.

Next, with reference to FIG. 7, a description will be given of a modification in which the internal combustion engine 1 of the above embodiment is partly modified. In this modification, as illustrated in FIG. 7, a second EGR passage 38 and an upstream temperature-increasing water passage 32 extend close to and along with each other. The second EGR passage 38 extends from an end of the upstream temperature-increasing water passage 32 close to a downstream integrated water passage 31 to a middle portion of the upstream temperature-increasing water passage 32 in the longitudinal direction, bends, passes over the upstream temperature-increasing water passage 32 and the downstream integrated water passage 31, and is opened in an outer surface of a pipe unit 27. By thus increasing the distance for which the second EGR passage 38 and the upstream temperature-increasing water passage 32 extend along together, water flowing in the upstream temperature-increasing water passage 32 can be increased utilizing EGR gas.

While the specific embodiment has been described above, the present disclosure is not limited to the above embodiment, and can be widely modified. For example, since the valve case 33, the connecting passage 34, the downstream temperature-increasing water passage 35, the first EGR passage 37, and the second EGR passage 38 are selective structures, they may be omitted in other embodiments. Further, while the internal combustion engine 1 is a V-type internal combustion engine and the constantly operating cylinder group 16 and the deactivatable cylinder group 19 are provided in the different banks 4 and 5, respectively, in the above embodiment, the constantly operating cylinder group 16 and the deactivatable cylinder group 19 may be provided in one bank as a straight engine. To the structure of the deactivation mechanism that deactivates the deactivatable cylinders 18, various known techniques can be applied. The position of the thermostat 43 is not limited to that adopted in the above embodiment, and it is satisfactory as long as the thermostat 43 is located at a position that can control the supply of water to the radiator 52. For example, the thermostat 43 may be located in the downstream integrated water passage 31 or the pipe 51 between the junction 41 of the downstream integrated water passage 31 and the entrance of the radiator 52.

An internal combustion engine according to an aspect of the embodiment includes a deactivatable cylinder group including at least one deactivatable cylinder that is selectively operated or deactivated according to a state of the internal combustion engine, a constantly operating cylinder group including a constantly operating cylinder that constantly operates during operation of the internal combustion engine, a first water passage provided around the deactivatable cylinder group, a second water passage provided around the constantly operating cylinder group, an upstream integrated water passage that communicates on an upstream side with a pump and communicates on a downstream side with upstream sides of the first water passage and the second water passage, a downstream integrated water passage that branches on an upstream side to communicate with downstream sides of the first water passage and the second water passage, has a junction in a middle portion, and communicates on a downstream side with a radiator, a connecting passage that connects the radiator and the pump, a third water passage that connects the connecting passage and a portion between the junction and an upstream end close to the second water passage in the downstream integrated water passage, and a device provided adjacent to at least a part of the third water passage to exchange heat with water flowing in the third water passage. Here, the device refers to a device whose temperature can be increased or is preferably increased, and includes, for example, a transmission, a throttle valve, or a heater core for an air conditioning apparatus.

According to this configuration of the embodiment, since the third water passage extends from the portion between the junction and the upstream end close to the second water passage in the downstream integrated water passage, water passing through the second water passage is likely to enter the third water passage, and water passing through the first water passage is unlikely to enter the third water passage. For this reason, even when the deactivatable cylinder is deactivated and the temperature of water in the first water passage becomes lower than the temperature of water in the second water passage, water of higher temperature is supplied to the third water passage. This enhances the temperature rising efficiency of the device.

Preferably, the internal combustion engine according to the embodiment further includes an exhaust passage communicating with at least one of the constantly operating cylinder and the deactivatable cylinder, and a part of the exhaust passage is provided adjacent to the third water passage so that heat exchange is made between exhaust air flowing in the exhaust passage and the water flowing in the third water passage.

According to this structure of the embodiment, since the temperature of the water flowing in the third water passage is increased by the exhaust air flowing in the exhaust passage, the temperature rising efficiency of the device is enhanced further.

The part of the exhaust passage according to the embodiment may be an EGR passage that introduces the exhaust air into a suction system of the internal combustion engine.

According to this structure of the embodiment, the temperature of EGR gas can be lowered by heat exchange with the water flowing in the third water passage. This can enhance the filling efficiency of suction air.

The part of the third water passage and the EGR passage according to the embodiment may be formed in one molded body.

According to this structure of the embodiment, the heat exchange efficiency between the EGR gas flowing in the EGR passage and the water flowing in the third water passage is enhanced, and the number of components is reduced.

The internal combustion engine according to the embodiment may further include two banks, the deactivatable cylinder group and the first water passage may be provided in one of the banks, and the constantly operating cylinder group and the second water passage may be provided in the other of the banks.

According to this structure of the embodiment, since the deactivatable cylinder group and the constantly operating cylinder group are located apart from each other, heat exchange is unlikely to occur between the water passing through the first water passage and the water passing through the second water passage, and the temperature of the water passing through the second water passage is kept even higher than the temperature of the water passing through the first water passage during cylinder deactivation. For this reason, the temperature of the water flowing in the third water passage is kept even higher.

An on-off valve according to the embodiment, which controls passage of water to the radiator, may be provided in a portion of the downstream integrated water passage on a downstream side of the junction or in a portion of the connecting passage on an upstream side of a portion of the connecting passage communicating with the third water passage.

According to this structure of the embodiment, the passage of water to the radiator can be controlled by the on-off valve.

Obviously, numerous modifications and variations of the present invention are possible in light of the above teachings. It is therefore to be understood that within the scope of the appended claims, the invention may be practiced otherwise than as specifically described herein.

What is claimed is:

1. An internal combustion engine comprising:
   a deactivatable cylinder group including at least one deactivatable cylinder to be selectively operated and deactivated according to a state of the internal combustion engine during operation of the internal combustion engine;
   a constantly operating cylinder group including a constantly operating cylinder to constantly operate during operation of the internal combustion engine;
   a first water passage provided around the deactivatable cylinder group;
   a second water passage provided around the constantly operating cylinder group;
   an upstream integrated water passage that communicates on an upstream side with a pump and communicates on a downstream side with upstream sides of the first water passage and the second water passage;
   a downstream integrated water passage that is connected on an upstream side to downstream sides of the first water passage and the second water passage, the downstream integrated water passage includes a junction at which passages respectively connected to the downstream sides of the first water passage and the second water passage join together, the downstream integrated water passage communicating on a downstream side thereof with a radiator;
   a connecting passage that connects the radiator and the pump;
   a third water passage that connects to the downstream integrated water passage at a location upstream of the junction; and
   a device provided adjacent to at least a part of the third water passage to exchange heat with water flowing in the third water passage.

2. The internal combustion engine according to claim 1, further comprising:
   an exhaust passage communicating with at least one of the constantly operating cylinder and the at least one deactivatable cylinder,
   wherein a part of the exhaust passage is provided adjacent to the third water passage so that heat exchange is made between exhaust air flowing in the exhaust passage and the water flowing in the third water passage.

3. The internal combustion engine according to claim 2, wherein the part of the exhaust passage comprises an EGR passage to introduce the exhaust air into a suction system of the internal combustion engine.

4. The internal combustion engine according to claim 3, wherein a part of the third water passage and the EGR passage are formed in one molded body.

5. The internal combustion engine according to claim 1, further comprising:
   a first bank; and
   a second bank,
   wherein the deactivatable cylinder group and the first water passage are provided in the first bank, and the constantly operating cylinder group and the second water passage are provided in the second bank.

6. The internal combustion engine according to claim 1, further comprising:
   an on-off valve to control passage of water to the radiator, the on-off valve being provided one of in a portion of the downstream integrated water passage on a downstream side of the junction and in a portion of the connecting passage on an upstream side of a position at which the connecting passage communicates with the third water passage.

7. The internal combustion engine according to claim 1, wherein the upstream end of the downstream integrated water passage is connected to the second water passage.

8. The internal combustion engine according to claim 1, wherein the junction is closer to downstream side of the second water passage than to the downstream side of the first water passage.

9. The internal combustion engine according to claim 8, wherein the third water passage connects to the downstream integrated water passage at a location between the downstream side of the second water passage and the location upstream of the junction.

10. The internal combustion engine according to claim 1, wherein the third water passage connects to the downstream integrated water passage at a location between the downstream side of the second water passage and the location upstream of the junction.

* * * * *